(12) United States Patent
Seyedi et al.

(10) Patent No.: US 10,365,433 B2
(45) Date of Patent: Jul. 30, 2019

(54) TAPERED OPTICAL WAVEGUIDES

(71) Applicant: HEWLETT PACKARD ENTERPRISE DEVELOPMENT LP, Houston, TX (US)

(72) Inventors: Mir Ashkan Seyedi, Palo Alto, CA (US); Chin-Hui Chen, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/756,573

(22) PCT Filed: Sep. 4, 2015

(86) PCT No.: PCT/US2015/048625
§ 371 (c)(1),
(2) Date: Feb. 28, 2018

(87) PCT Pub. No.: WO2017/039696
PCT Pub. Date: Mar. 9, 2017

(65) Prior Publication Data
US 2018/0267240 A1 Sep. 20, 2018

(51) Int. Cl.
*G02B 6/12* (2006.01)
*G02B 6/122* (2006.01)
(Continued)

(52) U.S. Cl.
CPC ....... *G02B 6/1228* (2013.01); *G02B 6/12007* (2013.01); *G02B 6/29338* (2013.01);
(Continued)

(58) Field of Classification Search
CPC .............. G02B 6/1228; G02B 6/12007; G02B 6/29338; G02B 2006/12097;
(Continued)

(56) References Cited

U.S. PATENT DOCUMENTS 6,571,039 B1 * 5/2003 Al-hemyari .......... G02B 6/1228
385/131
7,333,689 B2 2/2008 Menon et al.
(Continued)

FOREIGN PATENT DOCUMENTS

WO WO-2014116828 A2 7/2014

OTHER PUBLICATIONS

Hyder, H., All-optical Wavelength Division Demultiplexing Utilizing Silicon Microring Whispering Gallery Resonators, Apr. 11-13, 2013, Proceedings of NCUR, Univ. Wisconsin.
(Continued)

*Primary Examiner* — Michael P Mooney
(74) *Attorney, Agent, or Firm* — McDermott Will & Emery, LC

(57) ABSTRACT

An apparatus includes an optical rib waveguide on a substrate, the optical rib waveguide further includes: a slab layer of silicon, a shallow rib of silicon in height that tapers laterally along a taper region, a deep rib of silicon that meets the shallow rib along the taper region of the shallow rib, and wherein the deep rib and the shallow rib have a same width, and wherein the shallow rib has a greater height than the deep rib, a core of silicon that tapers laterally in a range of 50-90% and extends on top of the deep rib and the shallow rib, and a cladding layer of silicon oxide that covers the slab, core, deep rib, and shallow rib.

15 Claims, 4 Drawing Sheets

(51) Int. Cl.
    *G02B 6/293*     (2006.01)
    *G02F 1/015*     (2006.01)
    *G02F 1/025*     (2006.01)

(52) U.S. Cl.
    CPC .... *G02F 1/025* (2013.01); *G02B 2006/12097* (2013.01); *G02B 2006/12123* (2013.01); *G02F 2001/0151* (2013.01)

(58) Field of Classification Search
    CPC ........... G02B 2006/12123; G02F 1/025; G02F 2001/0151
    USPC ............................... 385/27–28, 43, 129–132
    See application file for complete search history.

(56) References Cited

U.S. PATENT DOCUMENTS

| | | |
|---|---|---|
| 7,613,369 B2 | 11/2009 | Witzens et al. |
| 2002/0168166 A1* | 11/2002 | Itoh ...................... G02B 6/1228 385/129 |
| 2003/0156794 A1 | 8/2003 | Oh et al. |
| 2003/0235367 A1 | 12/2003 | Yamazaki |
| 2011/0170825 A1 | 7/2011 | Spector et al. |
| 2014/0110572 A1 | 4/2014 | Li et al. |

OTHER PUBLICATIONS

PCT International Search Report; issued in PCT/US2015/048625; dated Jun. 16, 2015; 3 pages.

\* cited by examiner

TAPERED OPTICAL WAVEGUIDES

STATEMENT OF GOVERNMENT INTEREST

This invention was made with government support under Contract No. H98230-14-3-0011. The government has certain rights in the invention.

BACKGROUND

A waveguide is a physical structure that guides waves, such as light waves. Waveguides enable a signal to propagate with minimal loss of energy.

BRIEF DESCRIPTION OF THE DRAWINGS

The following detailed description references the drawings, wherein.

DETAILED DESCRIPTION

Computing devices have traditionally used copper wires to interconnect various integrated circuits (ICs). However, as computing devices have grown smaller and faster, the limits of signaling using copper wires have become more apparent. Increasingly, there has been a move toward using photonic devices having optical interconnects in integrated silicon-based circuits for networking, as well as for interconnecting integrated devices within a single computing device or system.

One building block of photonic devices is a ring resonator. A ring resonator comprises a set of waveguides in which at least one of the waveguides is a closed loop coupled to a light input and an output. An optical ring resonator uses total internal reflection and constructive interference to build the intensity of light at a particular resonant frequency. Optical resonators are thus useful for amplifying the intensity of light at the resonant frequency.

Current ring resonators are suboptimal in terms of their compatibility with existing silicon manufacturing processes, as well as their performance. This disclosure introduces a waveguide, heater, and a ring resonator that may be compatible with silicon manufacturing processes and design rules. For example, the waveguide, heater, and ring resonator may be compatible with the PCell libraries and PCell-based electronic design automation software. PCell (parameterized cell), is a concept used widely in the automated design of analog integrated circuits.

A PCell represents a part or a component of the circuit having a structure that is dependent on one or more parameters. Hence, a PCell is a cell which is automatically generated by electronic design automation (EDA) software based on the values of these parameters. The waveguide, heater, and ring resonator may also be compatible with various silicon foundries, including STMicroelectronics, and CEA-Leti. Thus, devices and systems describe herein may be produced in volume. Volume production of silicon-based photonic devices using standard cell libraries has not generally previously been possible.

By using a standard library such as PCell, aspects of this disclosure allow a circuit designer to customize geometries of the photonic system, such as waveguide width, taper, gaps, and resonator radius while maintaining compliance with foundries' process design rules. Additionally, by using a standard cell library, designers can perform experiments to accurately characterize device performance, variation, and reliability as a function of device geometry. Designers may then feed the results into theoretical models to include experimental variation and error. Circuit designers can use the simulation models, which resemble real-life device behavior, to integrate photonic components into standard CMOS (complimentary metal oxide semiconductor) design flows. Various aspects of this disclosure will now be described in greater detail with respect to the figures below.

Figure 1:
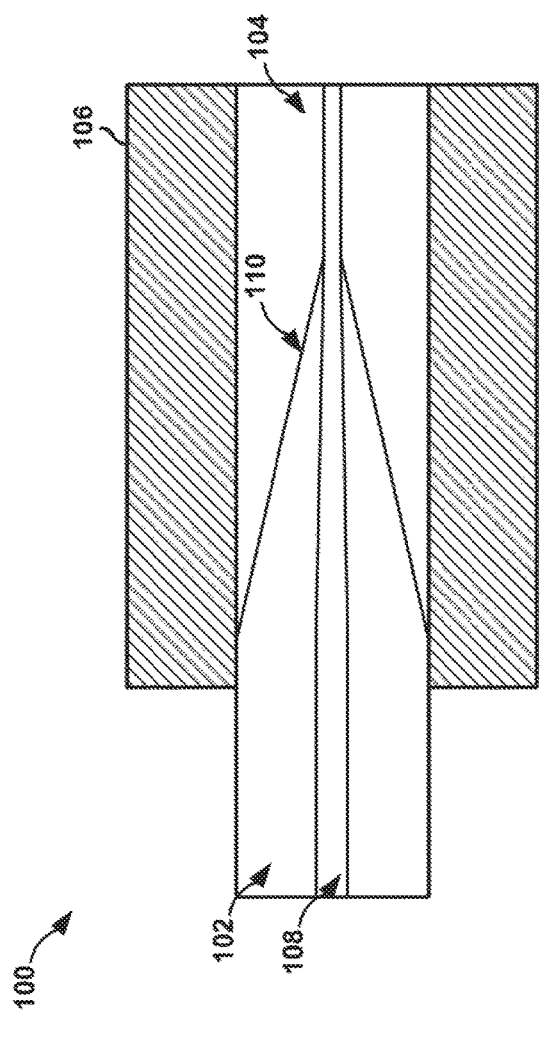
FIG. 1 is a conceptual diagram of an example tapered optical waveguide.

FIG. 1 is a conceptual diagram of an example tapered optical waveguide. An optical waveguide is of paramount importance in determining the characteristics of an optical device. The silicon photonics process flow for Leti and STMicroelectronics uses a deep 300 nm (nanometer) isolation etch, a 150 nm deep waveguide slab, and a 0 nm deep etch for a waveguide core (i.e., a shallow rib waveguide). However, this waveguide profile is not optimal for a ring resonator structure, primarily due to poor optical confinement, which results in increased optical loss with the ring resonators of this disclosure, which are based on a 300 nm isolation etch, a 50 nm high slab, and a 0 nm etch with a 300 nm waveguide core profile.

This disclosure introduces a low-loss, low-reflection region of a waveguide that adiabatically transitions the optical mode from a shallow rib region to a deep rib region. Further, this component also tapers the waveguide width as well in order to enhance the coupling between a bus waveguide and rings of the resonator. A standard waveguide core width for the Leti and STMicroelectronics process is a 450 nm waveguide core width. This disclosure describes a laterally tapering waveguide to the narrower waveguide width to optimize the coupling between the bus waveguide and rings. The dimensions of a tapering optical waveguide, in accordance with this disclosure and including a taper transition region, are illustrated in FIG. 1.

FIG. 1 includes a waveguide 100. Waveguide 100 is illustrated from a vertical (i.e., top-down) perspective. Waveguide 100 may be used to couple light with a ring resonator, as will be described in greater detail below. Waveguide 100 further comprises a shallow rib region 102, a deep rib region 104, a stab region 106, a core region 108, and a tapered region 110. Each of the regions illustrated in FIG. 1 is composed of silicon. In general, light, e.g., from a diode coupled to waveguide 100, enters waveguide 100 from the left and proceeds toward the right of waveguide 100. The light is confined within core 108, shallow rib 102, and deep rib 104. Slab region 106 may comprise a 50 nm to 75 nm high region of silicon, such as 50 nm, depending on manufacturing process. Slab region 106 is illustrated with diagonal hashing.

According to various aspects of this disclosure, shallow rib region 102 may have a height of 150 nm to 250 nm, such as 150 nm, again depending upon manufacturing process. In various examples, shallow rib region 102 may be 45-55% of the height of the Silicon layer of a SOI (silicon on insulator) layer. Shallow rib region extends horizontally and tapers at tapered region 110 at which point shallow rib region 102 becomes deep rib region 104. Deep rib region 104 may have a height of 50 nm to 75 nm, inclusive. Thus, at tapered region 110, the height of shallow rib region 102 of waveguide 100 may abruptly decrease, e.g. from 150 nm to e.g., 50 nm, where it becomes deep rib region 104.

In some examples, core region 108 may have a constant height 300 nm. However, depending on the foundry used, core region 108 may have a height from 280-500 nm. Core region 108 may also taper laterally. Core region 108 may taper laterally in a range of 50-90%. In some examples, core region 108 may have an initial width of 450 nm before tapering. The initial width may comprise the widest region of core region 108 before core region 108 tapers. The initial width and may taper to a width of 250-450 nm, inclusive. After core region 108 tapers to a final width, core region 108 may cease tapering.

Figure 2A:
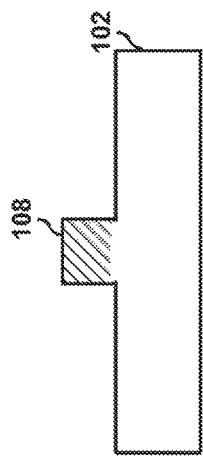
FIG. 2A is a conceptual diagram of an example of a shallow rib of a tapered optical waveguide.

FIG. 2A is a conceptual diagram of an example of a shallow rib of a tapered optical waveguide. The example of FIG. 2A may generally correspond to waveguide 100 of FIG. 1, but from a horizontal perspective rather than from the vertical perspective of FIG. 1. Core region 108 of FIG. 2A corresponds to core region 108 of FIG. 1, and is illustrated with diagonal hashing. Although not illustrated in FIG. 2A for the sake of simplicity, core region 108 tapers horizontally. Waveguide 100 also includes shallow rib region 102, which may have a height of 150 nm. Shallow rib region 102 tapers horizontally along taper region 110, which is not illustrated for the sake of simplicity.

Figure 2B:
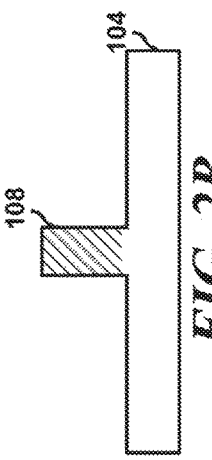
FIG. 2B is a conceptual diagram of an example of a deep rib of a tapered optical waveguide.

FIG. 2B is a conceptual diagram of an example of a deep rib of a tapered optical waveguide. The example of FIG. 2B may generally correspond to waveguide 100 of FIG. 1 but from a horizontal perspective rather than from the vertical perspective of FIG. 1. Core region 108 of FIG. 2A is illustrated with diagonal hashing, and corresponds to core region 108 of FIG. 2A. Although not illustrated in FIG. 2B for the sake of simplicity, core region 108 tapers horizontally. FIG. 2B also illustrates deep rib region 104, which may have a height of 50 nm to 75 nm, inclusive, such as 50 nm. Deep rib region 104 tapers horizontally along taper region 110, which is not illustrated for the sake of simplicity.

Figure 2C:
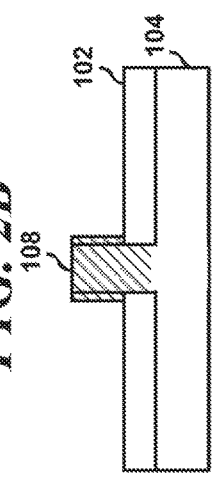
FIG. 2C is a conceptual diagram of an example perspective of a shallow rib and a deep rib of a tapered optical waveguide.

FIG. 2C is a conceptual diagram of an example perspective of a shallow rib and a deep rib of a tapered optical waveguide. The example of FIG. 2C corresponds to waveguide 100 of FIG. 1 from a horizontal perspective rather than from the vertical perspective of FIG. 1, FIG. 2C includes core region 108, shallow rib region 102, and deep rib region 104. Shallow rib region 102 tapers along taper region 110, which is not illustrated for the sake of simplicity. At taper region 110, shallow rib region 102 transitions to deep rib region 104. Shallow rib region 102 may have a height of 150 nm, and deep rib region 104 may have a height of 50 nm.

Core region 108 of FIG. 2C corresponds to core region 108 of FIGS. 1, 2A, and 2B. Core region 108 is illustrated with diagonal hashing. Core region 108 tapers laterally, as illustrated by the changing thickness of core region 108 in FIG. 2C.

Figure 2D:
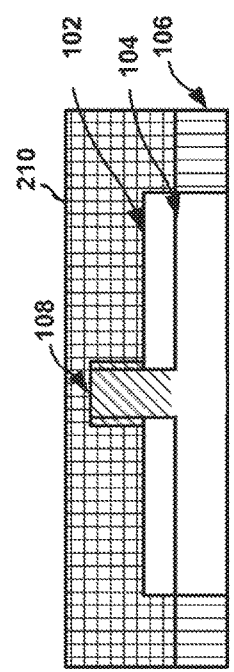
FIG. 2D is a conceptual diagram of an example perspective of a shallow rib, deep, rib, and cladding of a tapered optical waveguide

FIG. 2D is a conceptual diagram of an example perspective of a shallow rib, deep, rib, and cladding of a tapered optical waveguide. FIG. 2D corresponds to waveguide 100 of FIG. 1, and includes core region 108, shallow rib region 102, deep rib region 104, slab region 106, and cladding region 210. Slab region 106 is illustrated with vertical hashing. Slab region 106 may border deep rib region 104 and shallow rib region 102 horizontally as illustrated in FIG. 2D.

Cladding region 210 is located on top of core region 6 slab region 106, end deep rib region 102, and shallow rib region 104. Cladding region 210 is composed of an oxide layer, such as silicon dioxide in various examples. Cladding region 210 may have a much lower index of refraction (e.g., approximately 1.46) relative to the silicon-based core region 108, deep rib region 104, and shallow rib region 102.

Figure 3:
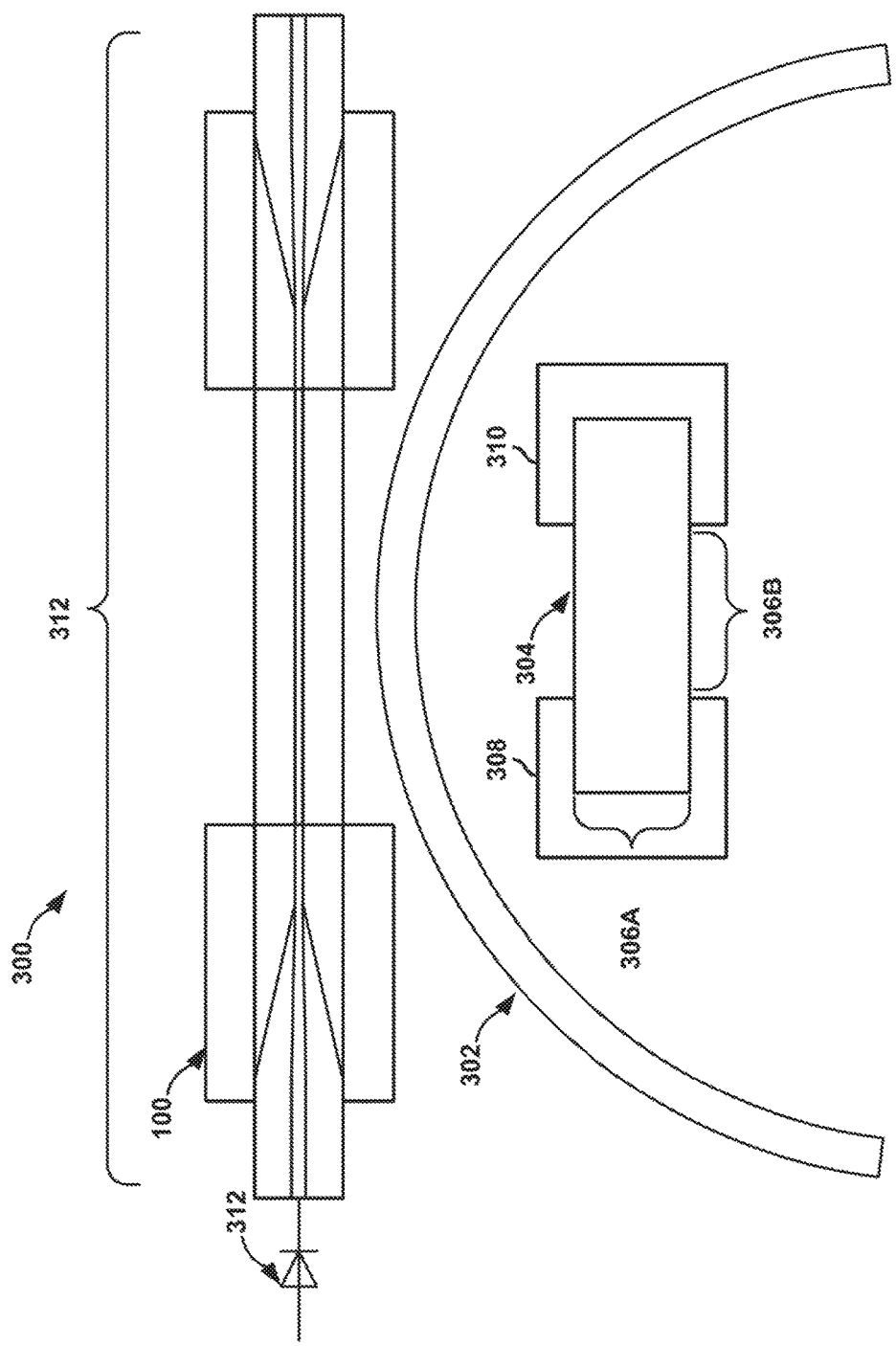
FIG. 3 is a conceptual diagram of an example of a system comprising a tapered waveguide, a heater, and ring resonator.

FIG. 3 is a conceptual diagram of an example of a system comprising a tapered waveguide, a heater, a diode, and a ring resonator. FIG. 3 includes waveguide 100, a partial view of ring resonator 302, heater 304, and doping regions 308, 310, and diode 312. Waveguide 100 is coupled to diode 312. Diode 312 emits light, which is confined by waveguide 100.

As light travels down waveguide and through bus region 312 of waveguide 100, the light may couple with ring resonator 302. For the sake of simplicity, only part of ring resonator 302 is illustrated (i.e. part of ring resonator 302 is cut off). As described above, ring resonator 302 may have a height of approximately 50 nm and may be composed of silicon. Ring resonator 302 may increase the intensity of certain resonant frequencies of light. A circuit designer may select dimensions of ring resonator 302 to select the resonant frequenc(ies) of ring resonator 302. A circuit designer may also select the distance (gap) between ring resonator 302 and waveguide 100 to maximize coupling and extinction ratio between waveguide 100 and ring resonator 302. In various examples, the gap distance may be between 150 and 400 nm, inclusive.

In various examples, system 300 may comprise an apparatus to generate light. The apparatus may further comprise ring resonator 302, a heater (304, 308, 310) located within a circumference of ring resonator 302, and a waveguide 100. Waveguide 100 may further comprise a shallow rib of silicon in height that tapers laterally along a taper region, a deep rib of silicon that meets the shallow rib along the taper region of the shallow rib, and wherein the deep rib and the shallow rib have a same width, and wherein the shallow rib has a greater height than the deep rib, a core of silicon that tapers laterally in a range of 50-90% and extends on top of the deep rib and the shallow rib, and a cladding layer of silicon oxide that covers the slab, core, deep rib, and shallow rib, and a slab layer of silicon.

Theoretically, the resonance value of ring resonator 302 may be determined based on the geometry of ring resonator 302. However, due to fabrication imperfections, system 300 includes a thermal tuner 304 that is used to control and tune the resonance wavelength. Tuning the resonance wavelength is achieved by locally heating the semiconductor material of system 300. Heating the semiconductor material (e.g., silicon) changes the refractive index and thus the optical properties and behavior of the coupling region between waveguide 100 and ring resonator 302.

Heater 304 may comprise a resistor in the 50-75 nm, e.g. 50 nm thick silicon slab region within the interior of the circumference of the ring resonator. Heater 304 is created by selectively doping the silicon material using either n-type or p-type doping to control the current path through resistor 304. The doping of heater 304 is illustrated by blocks 308 and 310. The doping of heater 304 may be stronger in blocks 308 and 310 relative to the region defined by callouts 306A, and 306B.

Various current delivery circuits coupled to heater 304 may inject current to heater 304, which causes local heating, e.g. at a coupling region between ring resonator 302 and waveguide 100. The local heating changes the resonant frequency of ring resonator 302. Experimental data indicates that a heater having a dimension of one square, i.e. a length to width ratio of 1, may produce more efficient results in terms of heating. The 1:1 ratio and the effective length of the heater are parameters of design for this component, which a circuit designer may alter. The vertical and horizontal dimensions of heater 304 are referenced by callouts 306A, and 306B, respectively. In various examples, system 300 may also include direct current (DC) and RF (radio frequency) probes for testing purposes. In various examples, DC pads contact heater at regions 310 and 308 to control the input into the heater.

Figure 4:
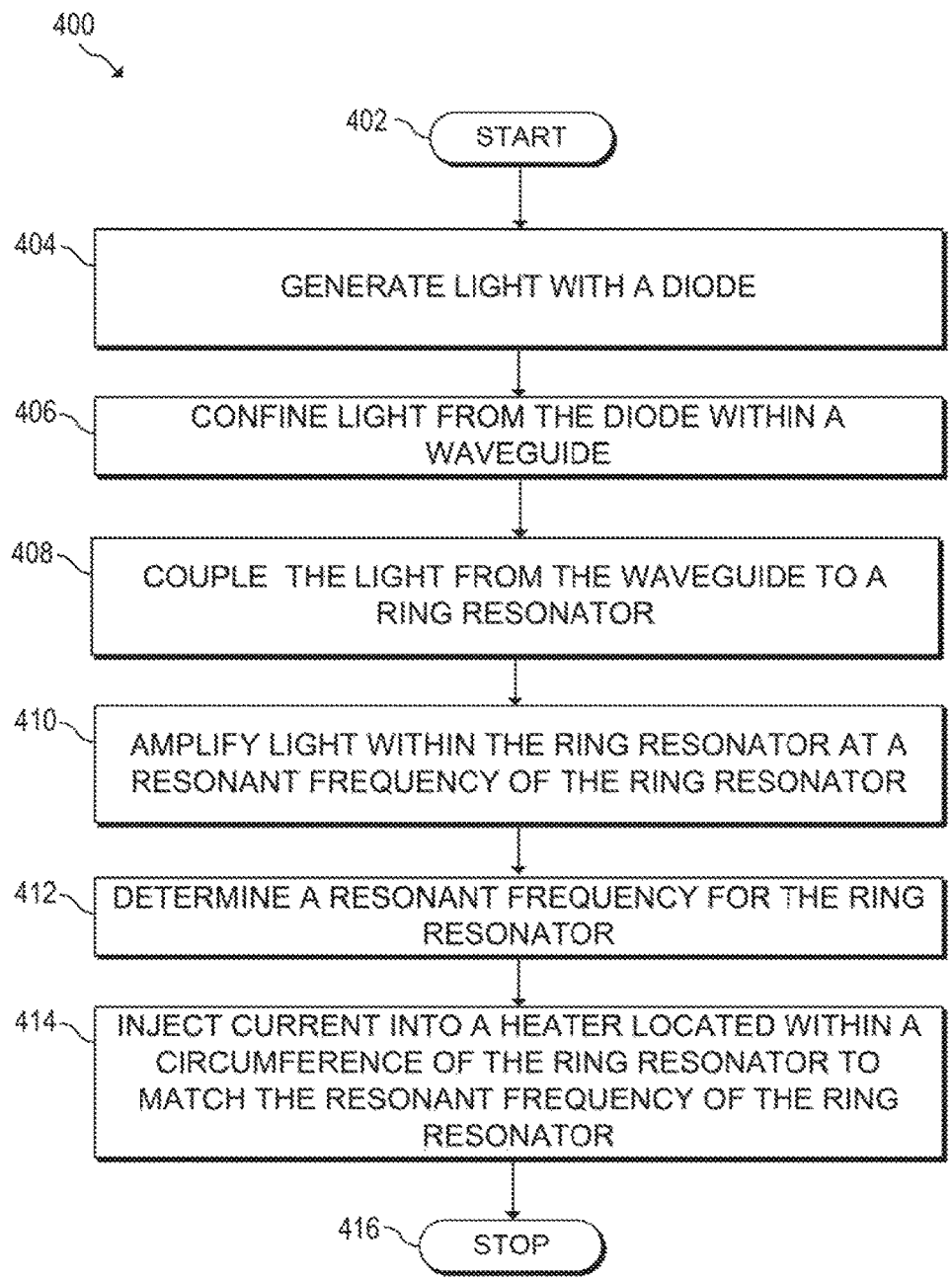
FIG. 4 is a flowchart of an example method for using a tapered optical waveguide.

FIG. 4 is a flowchart of an example method. Method 400 may be described below as being executed or performed by a system, for example, system 300 of FIG. 3. Other suitable systems and/or devices may be used as well. In alternate examples of the present disclosure, one or more blocks of method 400 may be executed substantially concurrently or in a different order than shown in FIG. 4. In alternate examples of the present disclosure, method 400 may include more or fewer blocks than are shown in FIG. 4. In some examples, one or more of the blocks of method 400 may, at certain times, be ongoing and/or may repeat.

Method 400 may start at block 402 and continue to block 404, where the system may generate light, e.g., with a diode. At block 406, the system may confine the light, e.g., from the diode, within a waveguide (e.g., waveguide 100). The waveguide may comprise a slab layer of silicon, a shallow rib of silicon in height that tapers laterally along a taper region, a deep rib of silicon that meets the shallow rib along the taper region of the shallow rib, wherein the stab layer borders the shallow rib and the deep rib. Additionally, the deep rib and the shallow rib may have a same width within the waveguide, and the shallow rib may have a greater height than the deep rib. The waveguide may further include a core of silicon that tapers laterally in a range of 50-90% and extends on top of the deep rib and the shallow rib, and the waveguide may further include a cladding layer of silicon oxide that covers the slab, core, deep rib, and shallow rib.

Method 400 may continue to block 408, where the system may couple the light from the waveguide (e.g., waveguide 100) to a ring resonator, e.g. ring resonator 302. The ring resonator may have a height of 50 nm (nanometers) to 75 nm, inclusive. At block 410, the ring resonator may amplify light within the ring resonator at a resonant frequency of the ring resonator.

Method 400 may further continue to block 412, where the system may determine a resonant frequency for the ring resonator, and to block 414, where the system may inject current into a heater, e.g., located within a circumference of the ring resonator, to match the resonant frequency of the ring resonator. In some examples, the heater may be square shaped, and may be comprised of either n-type doped silicon, or p-type doped silicon. Method 400 may continue to block 416, at which point method 400 may stop.

The invention claimed is:

1. An apparatus comprising an optical rib waveguide on a substrate, the optical rib waveguide comprising:
   a slab layer of silicon;
   a shallow rib of silicon that tapers laterally along a lateral taper region;
   a deep rib of silicon that extends along the lateral taper region of the shallow rib, and wherein at least a portion of the deep rib and the shallow rib have a same width, and wherein the shallow rib has a greater height than the deep rib;
   a core of silicon that tapers laterally in a range of 50-90% and extends on top of the deep rib and the shallow rib; and
   a cladding layer of silicon oxide that covers the slab, core, deep rib, and shallow rib.

2. The apparatus of claim 1, wherein the core has an initial width of 450 nm (nanometers).

3. The apparatus of claim 1, wherein the deep rib region has a height of 50 nm, and the shallow rib region has a height of 150 nm (nanometers).

4. The apparatus of claim 1, wherein the core tapers to a final width of between 250 and 400 nm (nanometers), inclusive.

5. A method comprising:
   generating light;
   confining the light within a waveguide, the waveguide comprising:
   a slab layer of silicon;
   a shallow rib of silicon that tapers laterally along a lateral taper region;
   a deep rib of silicon that extends along the lateral taper region of the shallow rib, wherein the slab layer borders the shallow rib and the deep rib,
   wherein at least a portion of the deep rib and the shallow rib have a same width, and wherein the shallow rib has a greater height than the deep rib;
   a core of silicon that tapers laterally in a range of 50-90% and extends on top of the deep rib and the shallow rib; and
   a cladding layer of silicon oxide that covers the slab, core, deep rib, and shallow rib.

6. The method of claim 5, further comprising coupling the light from the waveguide to a ring resonator, the ring resonator having a slab with a height of 50 to 75 nm (nanometers), inclusive; and
   amplifying light within the ring resonator at a resonant frequency of the ring resonator.

7. The method of claim 6, further comprising:
   determining a resonant frequency for the ring resonator; and
   injecting current into a heater located within a circumference of the ring resonator to match the resonant frequency of the ring resonator.

8. The method of claim 7, wherein the heater is square shaped, and comprises either n-type doped silicon, or p-type doped silicon.

9. An apparatus comprising:
   a ring resonator;
   a heater located within a circumference of the ring resonator; and
   a waveguide comprising:
   a slab layer of silicon;
   a shallow rib of silicon that tapers laterally along a lateral taper region;
   a deep rib of silicon that extends along the lateral taper region of the shallow rib, and wherein at least a portion of the deep rib and the shallow rib have a same width, and wherein the shallow rib has a greater height than the deep rib;
   a core of silicon that tapers laterally in a range of 50-90% and extends on top of the deep rib and the shallow rib; and
   a cladding layer of silicon oxide that covers the slab, core, deep rib, and shallow rib.

10. The apparatus of claim 9, further comprising:
a heater to receive injected current, wherein the heater heats a coupling region between the ring resonator and the waveguide.

11. The apparatus of claim 10, wherein the heater has dimensions of 1×1 unit squared.

12. The apparatus of claim 10, wherein the heater comprises a resistor of either n-type doped silicon or p-typed doped silicon.

13. The apparatus of claim 10, wherein the core has an initial width of 450 nm and tapers to a range of 250-400 nm (nanometers) inclusive.

14. The apparatus of claim 10, wherein the shallow rib has a height of 150 nm (nanometers), and the deep rib region has a height of 50 nm.

15. The apparatus of claim 10, further comprising a gap between the ring resonator and the waveguide in a range of 150 nm to 300 nm (nanometers), inclusive.

\* \* \* \* \*